United States Patent
Spielmann et al.

(10) Patent No.: US 7,113,914 B1
(45) Date of Patent: Sep. 26, 2006

(54) METHOD AND SYSTEM FOR MANAGING RISKS

(75) Inventors: Craig Spielmann, Montclair, NJ (US); Maria Hutter, Princeton Junction, NJ (US); Joel Klein, Croton, NY (US); Naresh Singhani, Paramus, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 09/545,381

(22) Filed: Apr. 7, 2000

(51) Int. Cl.
*G06Q 90/00* (2006.01)
(52) U.S. Cl. .............................................. 705/7; 705/1
(58) Field of Classification Search .................... 705/7, 705/8, 11, 1, 10; 703/17
See application file for complete search history.

(56) References Cited

U.S. PATENT DOCUMENTS

| | | | | |
|---|---|---|---|---|
| 4,975,840 A | | 12/1990 | DeTore et al. ................. | 705/5 |
| 5,521,813 A | | 5/1996 | Fox et al. | |
| 5,627,973 A | | 5/1997 | Armstrong et al. ........... | 705/10 |
| 5,726,884 A | * | 3/1998 | Sturgeon et al. ............... | 705/9 |
| 5,765,138 A | * | 6/1998 | Aycock et al. ................. | 705/7 |
| 5,798,950 A | * | 8/1998 | Fitzgerald ..................... | 703/17 |
| 5,884,287 A | | 3/1999 | Edesess ........................ | 705/36 |
| 5,893,079 A | | 4/1999 | Cwenar ........................ | 705/36 |
| 5,930,762 A | * | 7/1999 | Masch .......................... | 705/7 |
| 5,956,691 A | | 9/1999 | Powers .......................... | 705/4 |
| 5,991,743 A | * | 11/1999 | Irving et al. .............. | 705/36 R |
| 6,018,722 A | | 1/2000 | Ray et al. ..................... | 705/36 |
| 6,029,144 A | * | 2/2000 | Barrett et al. ................. | 705/30 |
| 6,038,537 A | | 3/2000 | Matsuoka ...................... | 705/7 |
| 6,078,904 A | | 6/2000 | Rebane ........................ | 705/36 |
| 6,088,678 A | | 7/2000 | Shannon ........................ | 705/8 |
| 6,119,097 A | * | 9/2000 | Ibarra .......................... | 705/11 |
| 6,119,103 A | * | 9/2000 | Basch et al. .................. | 705/35 |
| 6,122,623 A | * | 9/2000 | Garman ........................ | 705/36 |
| 6,223,143 B1 | * | 4/2001 | Weinstock et al. ............ | 703/17 |
| 6,330,546 B1 | * | 12/2001 | Gopinathan et al. .......... | 705/35 |

(Continued)

FOREIGN PATENT DOCUMENTS

WO     WO 98/59307     * 12/1998

(Continued)

OTHER PUBLICATIONS

Higuera et al., "Software Risk Management", Software Engineering Institute, Jun. 1996 [retrieved on Oct 9, 2002], 50 pages, Retrieved from: Google.com and http://www.kbs.uni-hannover.de/Lehre/SWT2/SS02/RiskManagement.pdf.*

(Continued)

*Primary Examiner*—Tariq R. Hafiz
*Assistant Examiner*—B. Van Doren
(74) *Attorney, Agent, or Firm*—Hunton & Williams LLP

(57) ABSTRACT

A data processing system and method of using said data processing system for assessing and managing risk is disclosed. The preferred embodiment of the method includes the steps of identifying a set of risk elements; determining an importance for each said risk element; identifying any subrisks associated with said risk elements; identifying one ore more control procedures for each said subrisk element; assigning weights to each said control procedure; rating compliance with each said control procedure and calculating an overall weighed compliance score. The method may further include the steps of for each non-fully compliant subrisk, allowing the user to determine whether to accept the risk or generate an action plan addressing the risk. The method may further preferably include calculating future compliance scores based on said action plans. The system further provides for sorting and displaying compliance scores by a number of parameters.

11 Claims, 10 Drawing Sheets

U.S. PATENT DOCUMENTS

| | | | |
|---|---|---|---|
| 6,397,202 B1* | 5/2002 | Higgins et al. | 706/47 |
| 6,405,179 B1* | 6/2002 | Rebane | 705/36 |
| 6,671,673 B1* | 12/2003 | Baseman et al. | 705/7 |
| 6,675,149 B1* | 1/2004 | Ruffin et al. | 705/8 |
| 6,757,660 B1* | 6/2004 | Canada et al. | 705/7 |
| 6,901,372 B1* | 5/2005 | Helzerman | 705/7 |
| 6,912,502 B1* | 6/2005 | Buddle et al. | 705/1 |
| 7,006,992 B1* | 2/2006 | Packwood | 705/38 |
| 2002/0120642 A1* | 8/2002 | Fetherston | 707/500 |
| 2002/0129221 A1 | 9/2002 | Borgia et al. | |
| 2004/0128186 A1 | 7/2004 | Breslin et al. | |
| 2005/0027649 A1 | 2/2005 | Cech | |

FOREIGN PATENT DOCUMENTS

| | | | |
|---|---|---|---|
| WO | WO 99/05598 | * | 2/1999 |

OTHER PUBLICATIONS

Strategies and Tactics, "Consulting Services", www.strategies-tactics.com, Jan 24, 1997 [retrieved on Oct. 15, 2002], 9 pages, Retrieved from: www.archive.org.*

Lerouge, Cynthia, "Managing by Projects", Strategic Finance, Nov. 1999 [retrieved on Oct. 15, 2002], 11 pages, Retrieved from: Dialog.*

"How to live up to deadlines", Industrial Computing, May 1989 [retrieved on Oct. 15, 2002], 5 pages, Retrieved from: Dialog.*

Haimes, Yacov Y., "Risk Modeling, Assessment, and Management", John Wiley & Sons, Inc., 1998, pp. 26-45, 93-112, and 159-182.*

PriceWaterhouseCoopers, screenshots of pwcglobal.com, 1999 [retrieved Jan. 27, 2005], pp. 1-12, retrieved from: goggle.com and archive.org.*

"Compliance: An exercise in Risk Management", Compliance Action, Apr. 1996 [retrieved Jan. 27, 2005], vol. 1, No. 7, pp. 1-3, retrieved from: bankersonline.com.*

Cook, Douglas O. and Cummins, David, The Wharton School, University of Pennsylvania, Productivity and Efficiency in Insurance: An Overview of the Issues, pp. 1-62.

Breitbart, Y.; Deacon, A.; Scheck, H.-J.; Sheth, A.; Weikum, G., Department of Computer Science, ETH Zurich, *Merging Application-centric and Data-centric Approaches to Support Transaction-oriented Multi-system Workflows*, pp. 1-8.

Antl, Boris and Laden, Richard; As easy as ASP, Euromoney-n382, pp. 160-166, Feb. 2001.

Royer, Paul S., Risk management: The undiscovered dimension of project management, Project Management Journal- v31n1, pp. 6-13, Mar. 2000.

Dialog search results, Feb 1999.

U.S. Appl. No. 11/290,472, Spencer.

* cited by examiner

METHOD AND SYSTEM FOR MANAGING RISKS

FIELD OF THE INVENTION

The present invention relates to a method and system for managing risks inherent in business activities and more particularly to a data processing apparatus and method for identifying, managing and quantifying risks and associated control procedures.

BACKGROUND OF THE INVENTION

Many organizations worldwide have developed practices for internal control. The Institute of Internal Auditors' ("IIA") Standards for the Professional Practice of Internal Auditing (Standards) defines control as:

. . . any action taken by management to enhance the likelihood that established objectives and goals will be achieved. Management plans, organizes, and directs the performance of sufficient actions to provide reasonable assurance that objectives and goals will be achieved. (Section 300.06)

According to Specific Standard 300.05, the primary objectives of internal control are to ensure:
1. The reliability and integrity of information.
2. Compliance with policies, plans, procedures, laws, regulations, and contracts.
3. The safeguarding of assets.
4. The economical and efficient use of resources.
5. The accomplishment of established objectives and goals for operations or programs.

Many organizations have recognized the need for tracking the effectiveness of internal control practices. For example, according to the IIA's Professional Practices Pamphlet 97-2, Assessing and Reporting on Internal Control, the IIA supports the Committee of Sponsoring Organizations of the Treadway Commission, recommendation that organizations should report on the effectiveness and efficiency of the system of internal control.

One system of internal control, the Control Self-Assessment (CSA) methodology, was initially developed in approximately 1987 and is used by many organizations to review key business objectives, risks involved in achieving objectives, and internal controls designed to manage those risks. The IIA states that some CSA proponents have expanded this description to encompass potential opportunities as well as risks, strengths as well as weaknesses, and the overall effectiveness of the system in ensuring that the organization's objectives are met.

CSA approaches and formats may differ from one organization to another, however, the three primary CSA approaches are: facilitated team meetings (also known as workshops), questionnaires and management-produced analysis. Organizations may combine more than one approach. Facilitated team meetings gather internal control information from work teams that may represent multiple levels within an organization. The questionnaire approach uses a survey instrument that offers opportunities for simple yes/no or have/have not responses. Management-produced analysis is any approach that does not use a facilitated meeting or survey.

While existing methodologies and systems, such as the CSA, offer some structure in approaching the control of risk, to date, no system or methodology known to the applicants exists that properly quantities risks and the effectiveness of control procedures designed to address such risks. For example, many existing systems rely on a single weak link approach, without consideration of the significance of such link. If an assessor utilizing the weak link approach identifies a large number of processes associated with a risk element (e.g. business continuity), the presence of a single non-complaint process would red-flag the entire risk element, regardless of the significance of the non-complaint process. Thus, existing systems provide no mechanism for comparing results over time, nor are they reliable for providing a meaningful index of how well individual entities are measuring risk.

The method and system of the present invention addresses these and other limitations by utilizing a quantative weighted approach to evaluating risk. A three-tiered approach to evaluate risk is preferably used, dividing the system into: "Risks", "Subrisks," and "Control Procedures." An assessor is prompted through a series of screens to rate risks as "High," "Medium" and "Low." At the next level (the "Subrisk" level), a set of control procedures is provided. Each control procedure is rated by the assessor according to a number of categories, such as GREEN (full compliance), YELLOW (partial compliance), RED (non-compliance), or BLUE (not applicable). Control Procedures are assigned different weights because some risks are more critical than others. For items which are not fully compliant (e.g. items rated either YELLOW (partial compliance) or RED (non-compliance)), the assessor must either indicate that the risk is acceptable or create an action plan where deliverables are identified and target dates are established.

The system further provides a method of weighing, sorting and graphing displays which allows management to more easily identify significant areas of risk. This allows assessors to sort and view data in a number of ways, such as toy organization, business line, city and process. The display system further allows the user to "drill down" by clicking on high risk areas facilitating the identification of specific assessments which are having a significant impact on the risk rating.

Targets are derived from the Action Plans. A target is an index or measure which informs management of progress against action plans. Targets and actual results will be compared from quarter to quarter, to determine whether appropriate progress is being made against commitments.

BRIEF DESCRIPTION OF THE FIGURES

These and other aspects of the present invention are more apparent in the following detailed description and claims, particularly when considered in conjunction with the accompanying drawings showing a system constructed in accordance with the present invention, in which:

FIG. 3 is an exemplary computer display for rating the importance of a set of risk elements;

FIG. 5 is an exemplary computer display for accepting risks or entering action plans;

DETAILED DESCRIPTION OF THE INVENTION

Figure 1:
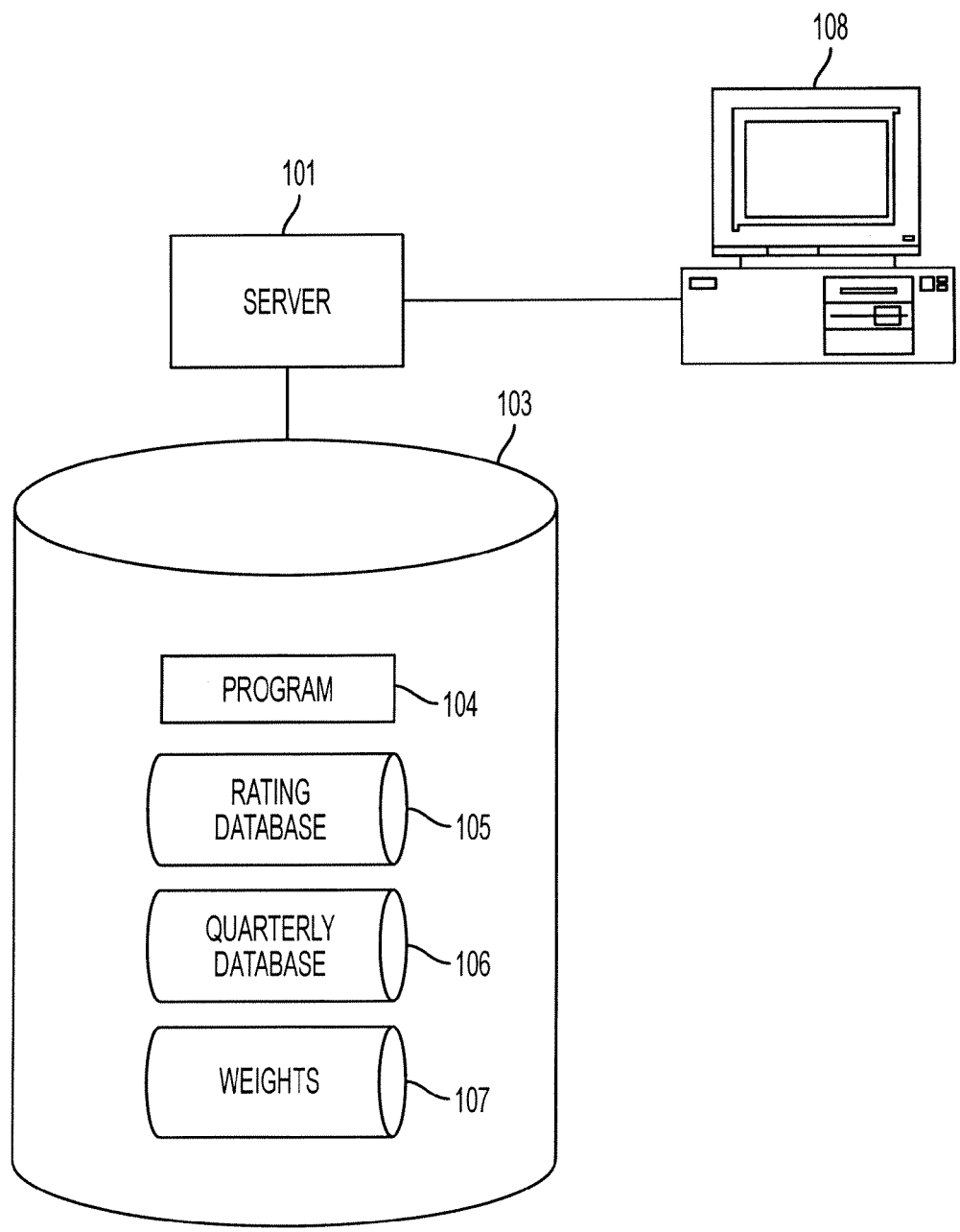
FIG. 1 is a system diagram showing the components of an exemplary system implementing the present invention.

FIG. 1 depicts the components of an exemplary computing system implementing the inventive system for managing risk. Server 101 includes one or more communications ports 109 for communicating with assessors utilizing client workstations 108. Server 101 is coupled to one or more storage devices 103. Storage device(s) 103 include an executable or interpretable program 104 for controlling the management system. Storage device(s) 103 also include a rating database 105 containing data elements necessary for the rating process, and a quarterly assessment database 106 containing data elements necessary for quarterly assessments.

Figure 2:
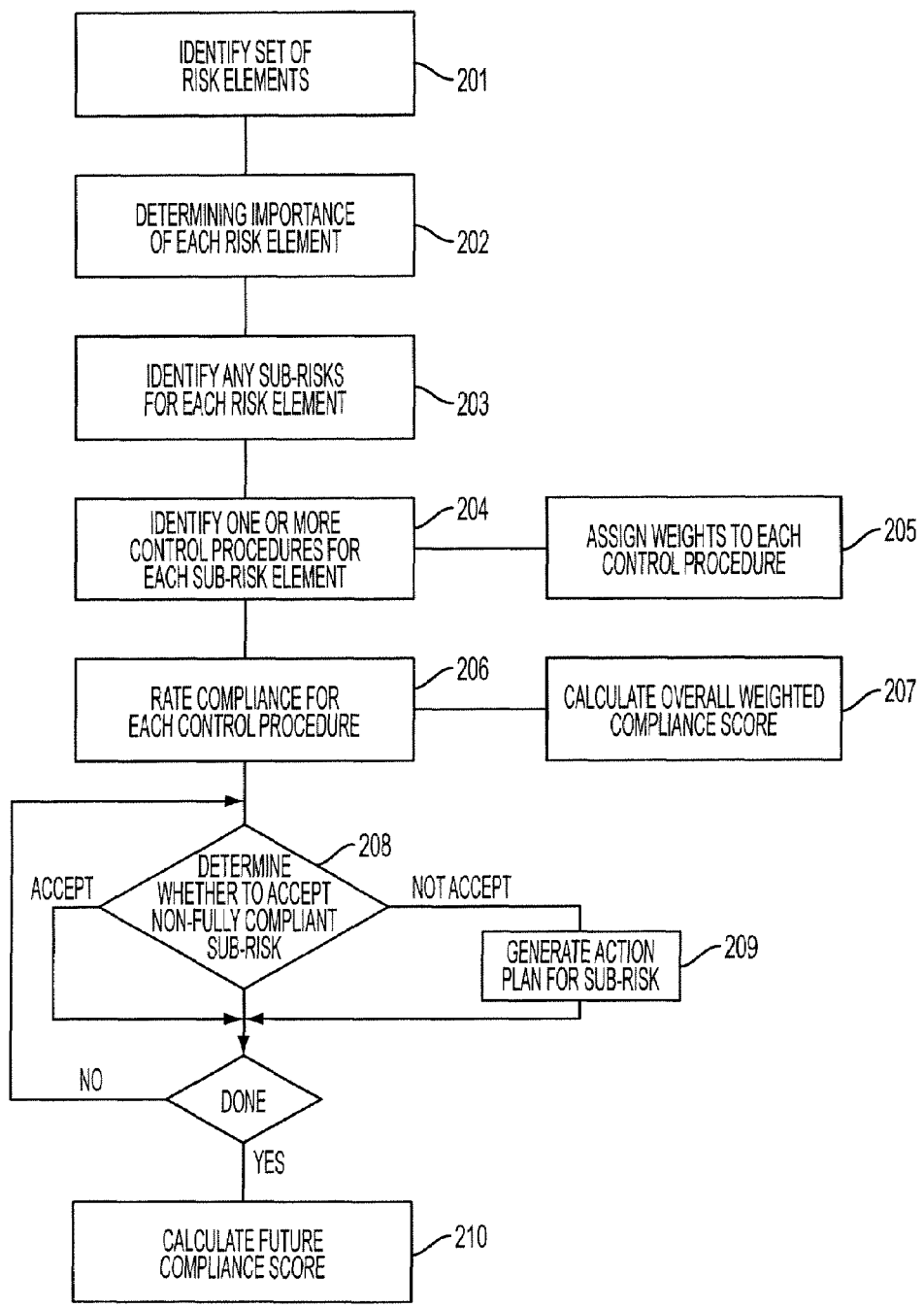
FIG. 2 is a logic diagram showing a preferred embodiment of the risk management system of the present invention.
Figure 3:
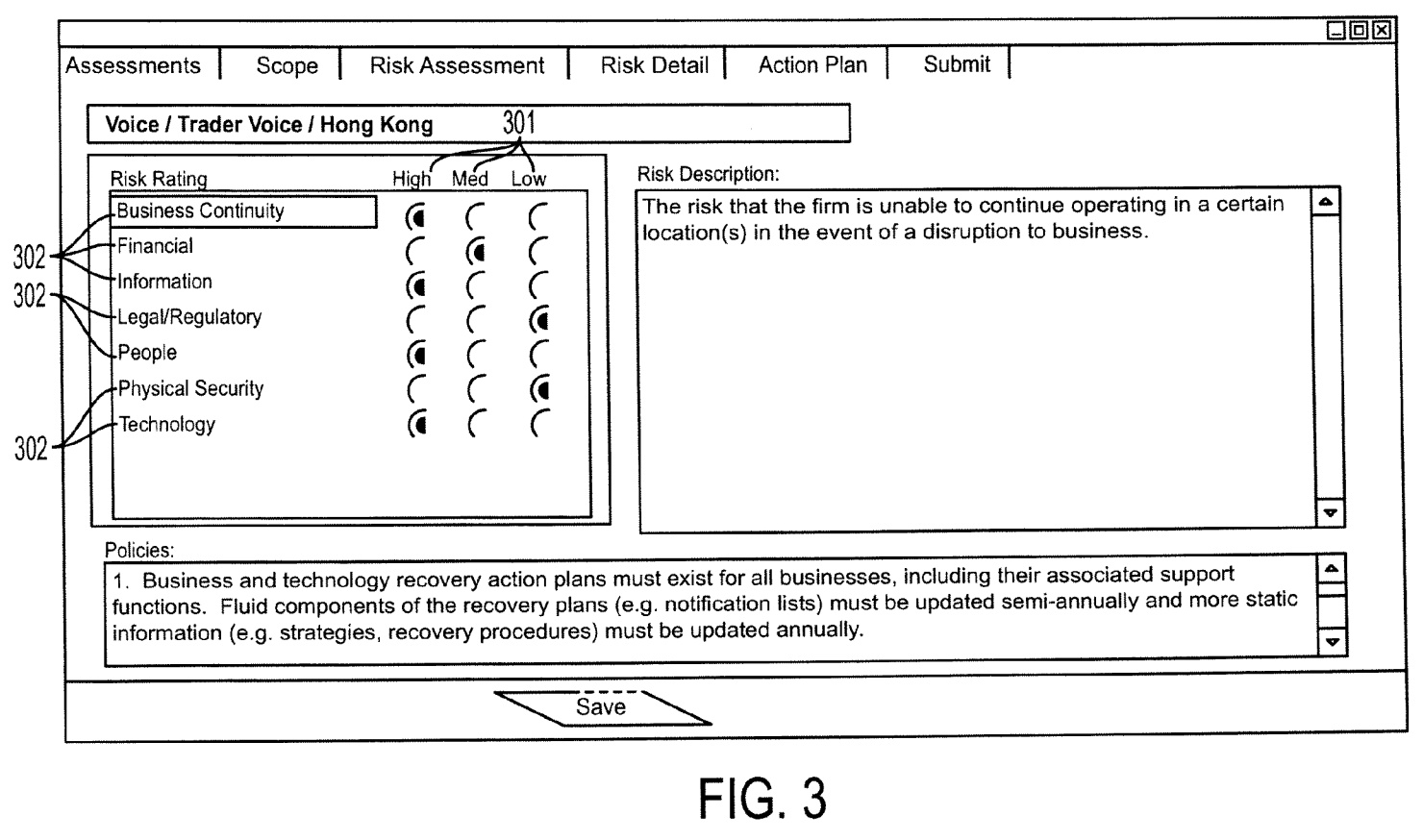

FIG. 2 presents an overview of the inventive process of categorizing, weighing and tracking risks. Initially, a set of risk elements are identified 201. The following are exemplary risks in the field of investment management: (i) Business continuity, (ii) Financial, (iii) Information, (iv) Legal/Regulatory, (v) People, (vi) Physical Security, and (vii) Technology, however the set of risk elements will vary from application to application. Each risk is rated 202 preferably according to a fixed set of criteria. In the preferred embodiment of the invention these criteria comprise the probability of occurrence and the impact to the business should the situation occur. Each risk is also preferably rated by a fixed set of rankings, such as "High," "Medium" and "Low." FIG. 3 is an exemplary computer display showing the rating 301 of risk elements 302 as High, Medium or Low. Each of these ratings 301 is stored in rating database 105 with the associated risk elements 302. Although not used in the preferred embodiment of this invention, these criteria and rankings may optionally be used in the weighing formula discussed below.

Figure 4:
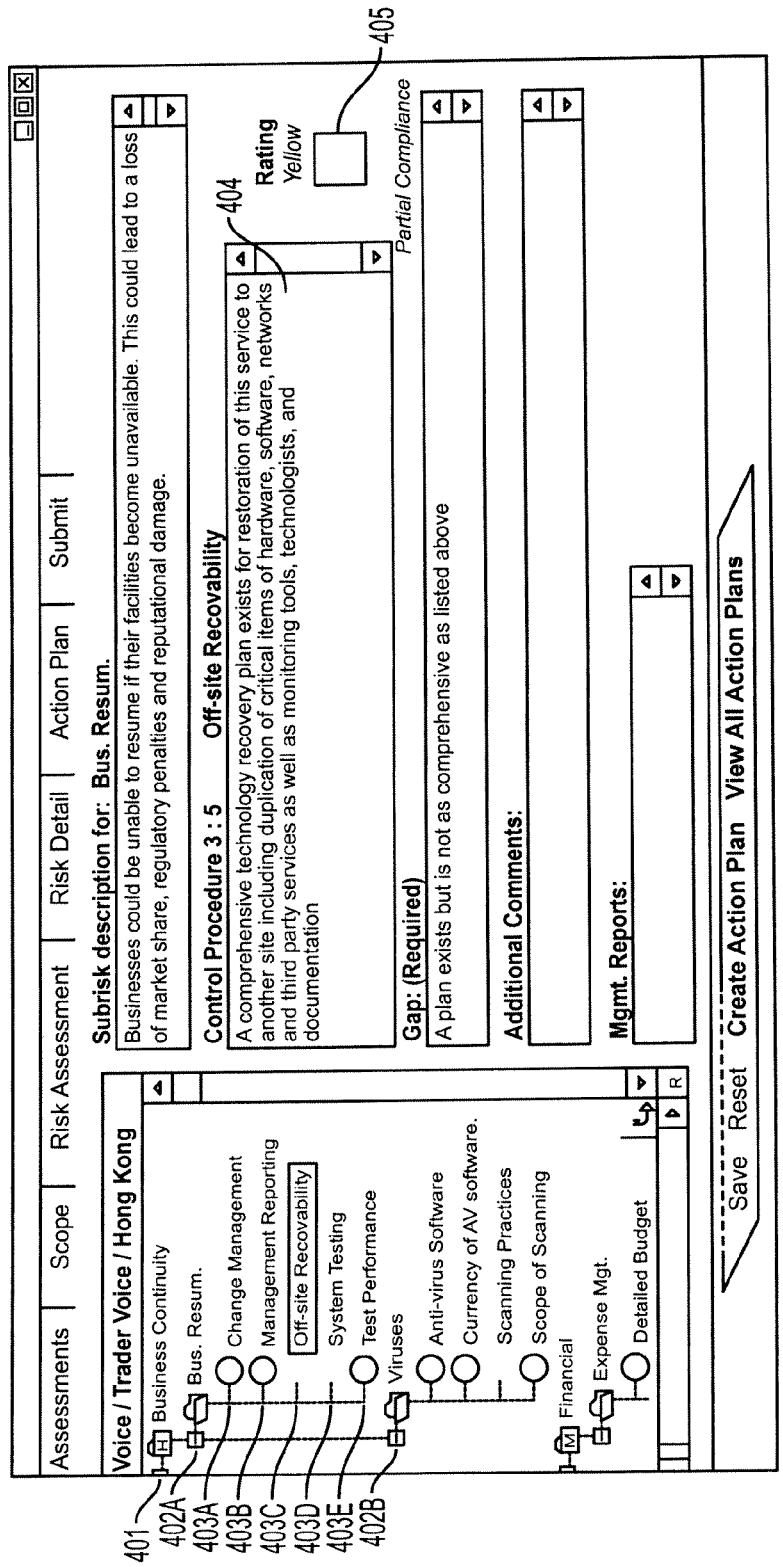
FIG. 4 is an exemplary computer display showing subrisks, control procedures, compliance ratings and an action plan for non-fully complaint risks.

Each subrisk of the risk elements is identified 203 and presented to the user. In the preferred embodiment, these subrisks comprise:

1. Business Resumption:
   i. Business Resumption; and
   ii. Viruses.
2. Financial:
   i. Expense Management.
3. Information:
   i. Restoration; and
   ii. Security.
4. Legal/Regulatory:
   i. Vendor Management; and
   ii. Software Licensing.
5. People:
   i. Capabilities; and
   ii. Compliance.
6. Physical Security:
   i. Physical access.
7. Technology:
   i. Change management;
   ii. Problem management;
   iii. Strategy; and
   iv. Dependability FIG. 4 is an exemplary computer display showing the display of the subrisks, Business Resumption and Viruses 402A & 402B, identified in the preferred embodiment for the Business Resumption risk 401.

One or more control procedures for each sub-element are then identified 204 and displayed to the user. In the preferred embodiment, these control procedures comprise:

Risk: 1. Business Continuity
Subrisks:
  i. Business Resumption:
  Control Procedures:
    a. Change Management;
    b. Management Reporting;
    c. Off-site Recovability;
    d. Test Performance; and
    e. Testing.
  ii. Viruses
  Control Procedures:
    a. Anti-virus Software;
    b. Currency of Anti-virus Software;
    c. Scanning Practices; and
    d. Scope of Scanning.
2. Financial
Subrisks:
  i. Expense Management:
  Control Procedures:
    a. Detailed budget;
    b. Expenditure vs. plan; and
    c. Expense Management Report.
3. Information
Subrisks:
  i. Restoration
  Control Procedures:
    a. Data back-up requirements;
    b. Media worthiness;
    c. Off-site storage;
    d. Back-up performances; and
    e. Back-up testing.
  ii. Security
  Control Procedures:
    a. Security awareness;
    b. Data guardian;
    c. User ID administration;
    d. Rectification;
    e. User termination procedures;
    f. Violation monitoring;
    g. Dial-up access;
    h. Adherence to standards;
    i. Access approval process;
    j. Testing;
    k. User time-out; and
    l. Data encryption.
4. Legal/Regulatory
Subrisks:
  i. Vendor Management
  Control Procedures:
    a. Legal counsel;
    b. Escape clauses;
    c. Audit clauses;
    d. Adherence to policies;
    e. Point person established;
    f. Escalation process;
    g. Billing reconciliation; and
    h. Performance reporting.

ii. Software Licensing
Control Procedures:
  a. Awareness;
  b. Software inventory;
  c. Documentation;
  d. Upgrade documentation;
  e. Compliance testing;
  f. Invoices; and
  g. Entitlements—market data access is assigned to users based on contractual agreements.

5. People
Subrisks:
  i. Capability
  Control Procedures:
    a. Sourcing Strategy;
    b. Staff Retention;
    c. Succession Plans;
    d. Recruiting;
    e. Performance evaluations; and
    f. Attrition.
  i. Compliance
  Control Procedures:
    a. Diversity;
    b. Core Values;
    c. JPM work authorization;
    d. Adherence to policies; and
    e. Policy Review.

6. Physical Security
Subrisks:
  i. Capability
  Control Procedures:
    a. Location Security;
    b. Restricted Access;
    c. Recertification;
    d. Termination process;
    e. Environment controls; and
    f. Power supply.

6. Technology
Subrisks:
  i. Change Management
  Control Procedures:
    a. Documented Process;
    b. Process Compliance;
    c. Testing Changes;
    d. Business Communication;
    e. Change Integrity;
    f. Emergency Change Approval;
    g. Planning & Scheduling;
    h. Offsite Change Coordination;
    i. Back out;
    j. Segregation of Duties; and
    k. Business Impact.
  ii. Problem management
  Control Procedures:
    a. Documented Process;
    b. Monitoring and Alerts;
    c. Help Desk;
    d. Problem reporting process;
    e. Trend Analysis; and
    f. Problem resolution.
  iii. Strategy
  Control Procedures:
    a. Business Plans;
    b. Business Sponsorship;
    c. Strategy Alignment;
    d. Strategy Communication;
    e. Project Marketing;
    f. Service Level Agreements;
    g. Project Management; and
    h. Management Reporting.
  iv. Dependability
  Control Procedures:
    a. Adherence Standards;
    b. Performance Monitoring;
    c. Service Level Agreements;
    d. Management Reporting;
    e. Capacity Planning;
    f. Hardware Reliability;
    g. Hardware Refresh;
    h. Software Currency;
    i. Level of business impact;
    j. Assets Inventory;
    k. Redundancy; and
    l. Y2K Compliance.

FIG. 4 shows the display of the control procedures 403A–403E for the Business Resumption subrisk 402A. The user is provided with a detailed description 404 of each control procedure by selecting one of the descriptive terms 403A–403E listed under the associated subrisk.

Each control procedure is assigned 205 a weight or control procedure priority ("CP-priority"). In the preferred embodiment, the following CP-priorities are used: very high=10, high=7, medium=4 and low=1. Each assigned CP-priority is stored in the rating database 105. Priorities for control procedures are preferably pre-set by an administrator.

Figure 5:
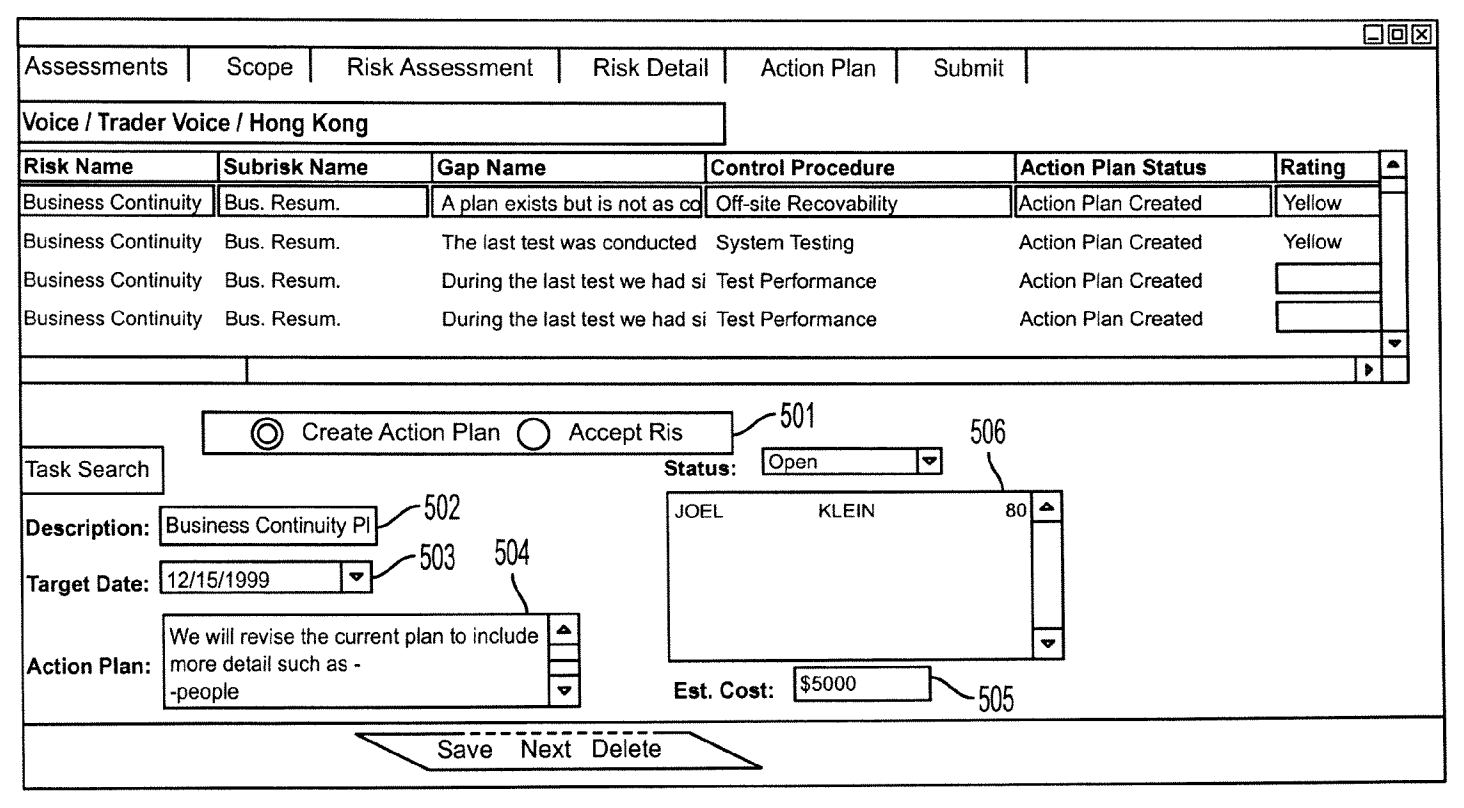

The user is prompted to enter (see 405, FIG. 4) a compliance rating for each control procedure 206. In the preferred embodiment, these ratings comprise: green=full compliance, yellow=partial compliance, red=non-compliance, and blue=not applicable. For each non-compliance or partial compliance control procedure, the user will be prompted 501 (FIG. 5) to determine 208 whether to enter an action plan or accept the risk. For each action plan created 209, the user will enter a description 502, target date 503 and additional comments 504. The user may also enter an estimated cost 505 and assign individuals 506 to the action plan.

In the preferred embodiment, each assessor also associates a number of additional parameters with each subrisk and/or control procedure. For example, the assessor may associate a process, city or region, or organization with each entry. Other parameters would be apparent in other applications. This associated data is stored in the rating database 106 and may be used for sorting and displaying as discussed below.

The compliance score is preferably based on cumulative weighting of two factors: the priority weight of each control procedure ("CP_weight") and the compliance or status factor ("CP_status_factor") for each such control procedure. In the preferred embodiment, this is calculated as:

Subrisk score equals:

$$\Sigma_{control\ procedures}((CP\_weight/(\Sigma_{control\ procedures}(CP\_weight))*CP\_status\_factor)*10,$$

and the overall score equals the average of all the subrisk scores.

where:

$\Sigma_{control\ procedures}$ sums the control procedures for a given subrisk.

| status | weight |
|---|---|
| CP_weight ranges from: | |
| extremely high | scaleable (i.e. 10) |
| high | scaleable (i.e. 7) |
| medium | scaleable (i.e. 4) |
| low | scaleable (i.e. 1) |

| status | weight |
|---|---|
| CP_status_factors range from: | |
| full compliance (green) | scaleable (i.e. 10) |
| partial compliance (yellow) | scaleable (i.e. 4) |
| non-compliance (red) | scaleable (i.e. 1) |
| not applicable (blue) | scaleable (i.e. 0) |

An example implementation of this scoring system is given in Table I below:

TABLE I

| CP Priority | CPP Weight |
|---|---|
| Extr. (EH) High | 1.8 |
| High (H) | 1.1 |
| Med. (M) | 1 |
| Low (L) | 0.5 |

| Status | Factor |
|---|---|
| Green (G) | 10 |
| Yellow (Y) | 6 |
| Red (R) | 2 |
| Blue (B) | 0 | scoring

| Subrisk A | CP | Priority | Weight | Status | Status Factor | Weight % | Status factor x weight % | |
|---|---|---|---|---|---|---|---|---|
| | A | EH | 1.8 | G | 10 | 33% | 3.33 | |
| | B | H | 1.1 | R | 2 | 20% | 0.41 | |
| | C | M | 1 | Y | 6 | 19% | 1.11 | |
| | D | M | 1 | G | 10 | 19% | 1.85 | |
| | E | L | 0.5 | R | 2 | 9% | 0.19 | |
| | F | M | 0 | B | 0 | | | |
| | | Total Weight | | | | 100% | 6.89 | Add up scores |
| | | | 5.4 | | | | 68.89 | Total score x 10 | scoring

| Subrisk B | CP | Priority | Weight | Status | Status Factor | Weight % | Status factor x weight % | |
|---|---|---|---|---|---|---|---|---|
| | G | EH | 1.8 | R | 2 | 46% | 0.92 | |
| | H | H | 1.1 | R | 2 | 28% | 0.56 | |
| | I | L | 0.5 | G | 10 | 13% | 1.28 | |
| | J | L | 0.5 | G | 10 | 13% | 1.28 | |
| | | Total Weight | | | | | | |
| | | | 3.9 | | | 100% | 4.05 | Add up scores |
| | | | | | | | 40.51 | Total score x 10 |

TABLE I-continued

| | | | | scoring | | | | |
|---|---|---|---|---|---|---|---|---|
| Subrisk C | CP | Priority | Weight | Status | Status Factor | Weight % | Status factor x weight % | |
| | K | EH | 1.8 | R | 2 | 32% | 0.63 | |
| | L | EH | 1.8 | G | 10 | 32% | 3.16 | |
| | M | EH | 0.5 | G | 10 | 9% | 0.88 | |
| | N | L | 0.5 | Y | 6 | 9% | 0.53 | |
| | O | M | 0 | B | 0 | 0% | 0.00 | |
| | P | M | 0 | B | 0 | 0% | 0.00 | |
| | Q | H | 1.1 | G | 10 | 19% | 1.93 | |
| | | Total Weight | | | | 100% | 7.12 | Add up scores |
| | | | 5.7 | | | | 71.23 | Total score x 10 |
| | Overall Score | | | | | | | |
| | | | score | | | | | |
| Subrisk A | | | 68.89 | | | | | |
| Subrisk B | | | 40.51 | | | | | |
| Subrisk C | | | 71.23 | | | | | |
| | | Total Weight | 180.63 | Divide 180.6/3 by # of Subrisks (e.g. 3) | 60.21 | | | |

Based on the target dates set in the action plans, the system may also optionally calculate 210 future compliance scores. This allows assessors to easily determine whether action plans are aggressive enough or unnecessarily aggressive. This also allows administrators to create a simple metric for determining how well groups perform in meeting their action plans.

Figure 6:
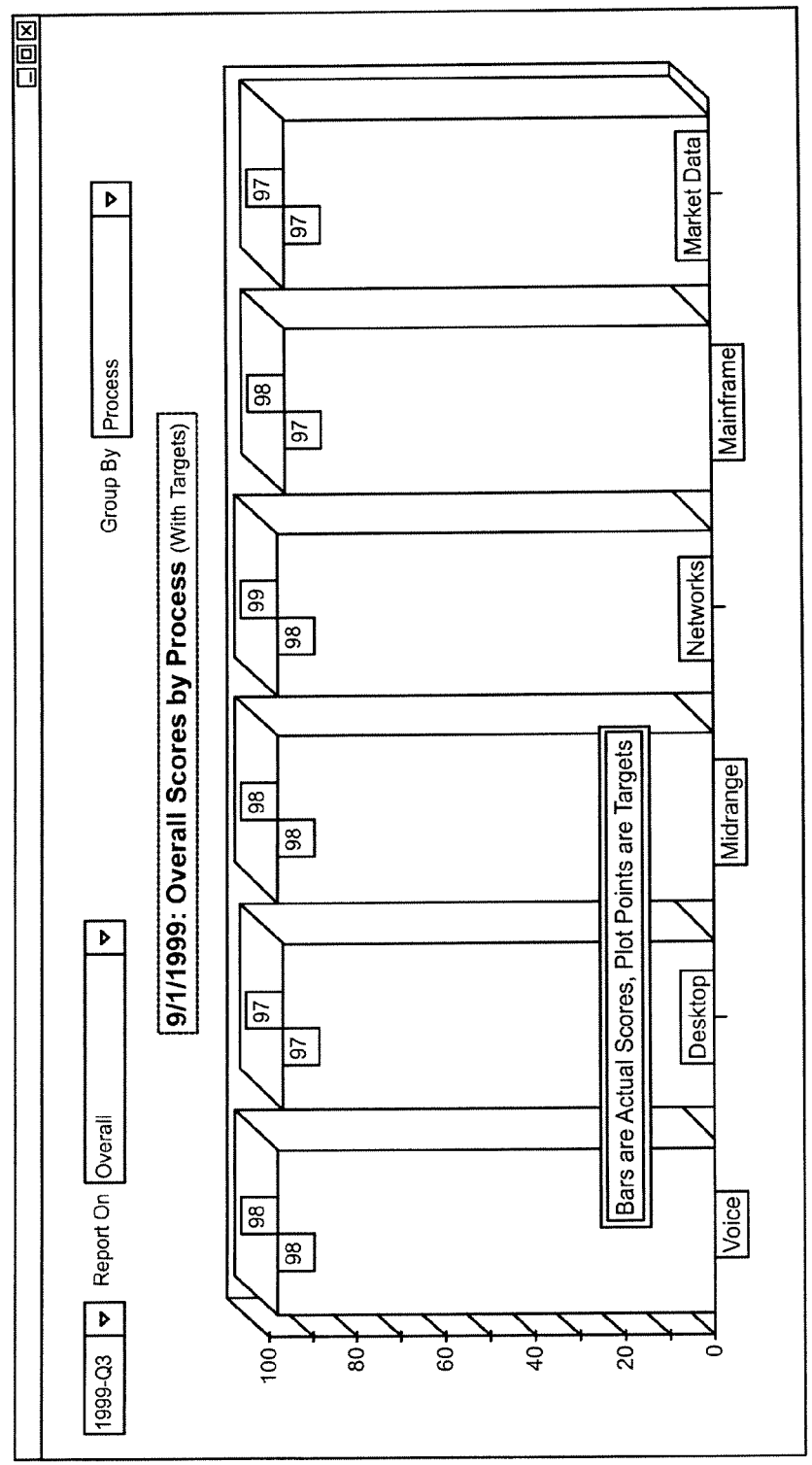
FIG. 6 is an exemplary computer display showing overall compliance scores sorted by business process.
Figure 7:
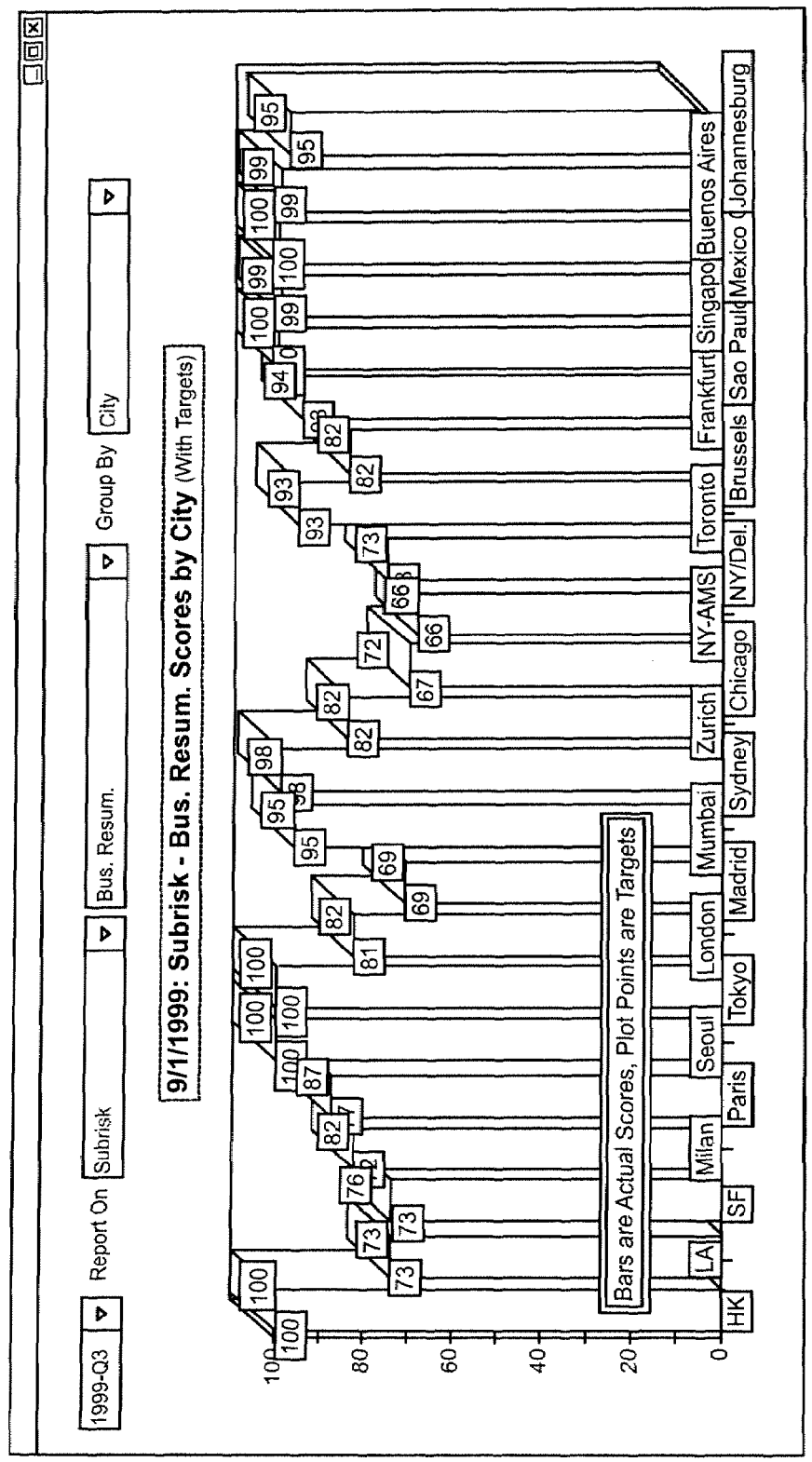
FIG. 7 is an exemplary computer display showing compliance scores for a specific subrisk sorted by city.

The novel system of weighing and categorizing risk of the present invention also facilitates the display of risk data in a number of ways which heretofore had not been possible. For example, compliance scores may be sorted by process (e.g., voice, desktop, midrange, networks, mainframe, market data, etc.) and displayed as shown in FIG. 6. As a further example, FIG. 7 shows compliance scores for individual subrisks sorted by business location. Various other ways of sorting and displaying compliance scores will be apparent to those of skill in the art and include, for example, compliance scores for individual processes sorted by business organization, or compliance scores for individual business organizations sorted by business location. Such displays are extremely helpful to management in locating weak spots in risk compliance.

Figure 8:
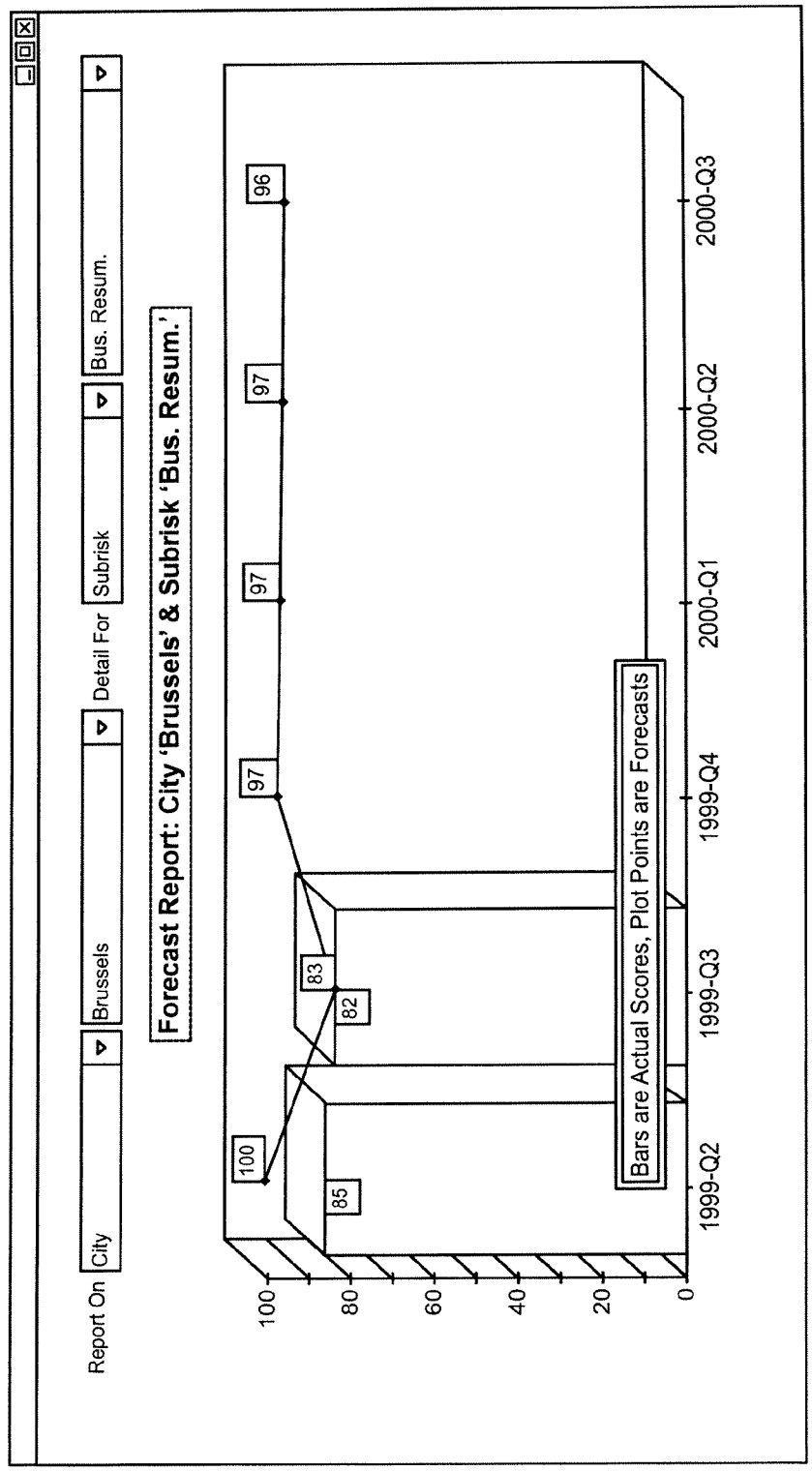
FIG. 8 is an exemplary computer display showing a forecast report sorted by city and subrisk.
Figure 9:
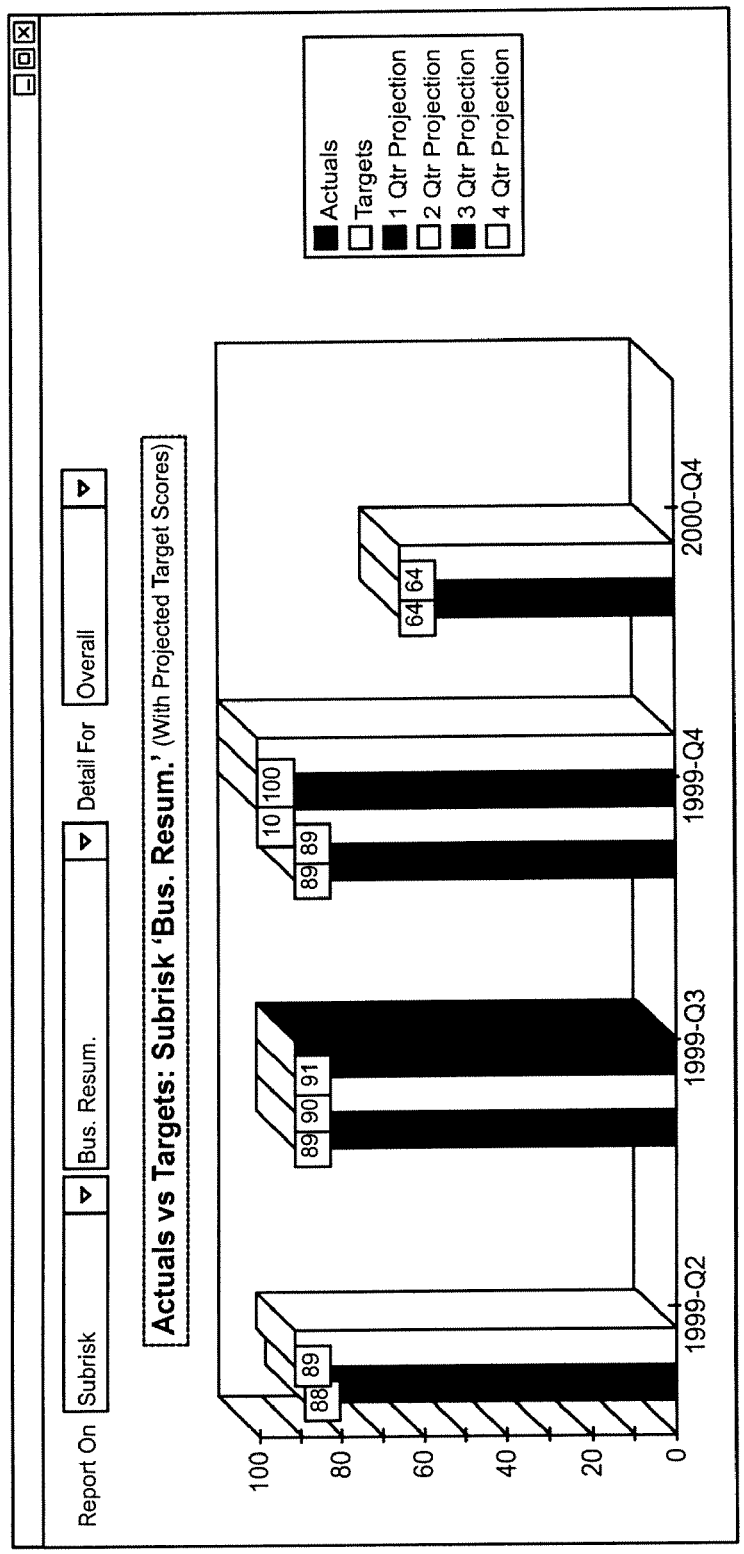
FIG. 9 is an exemplary computer display showing actual versus target compliance scores sorted by subrisk.

The system of the present invention also facilitates the ability to predict future levels of compliance and to teach entities ability to meet forecasts. Forecasts versus actual results may be sorted in any of a number of ways. FIG. 8 shows the forecast versus actual results for an individual city and individual subrisk. As shown in FIG. 9, actual versus target results may be sorted by subrisk and displayed.

Figure 10:
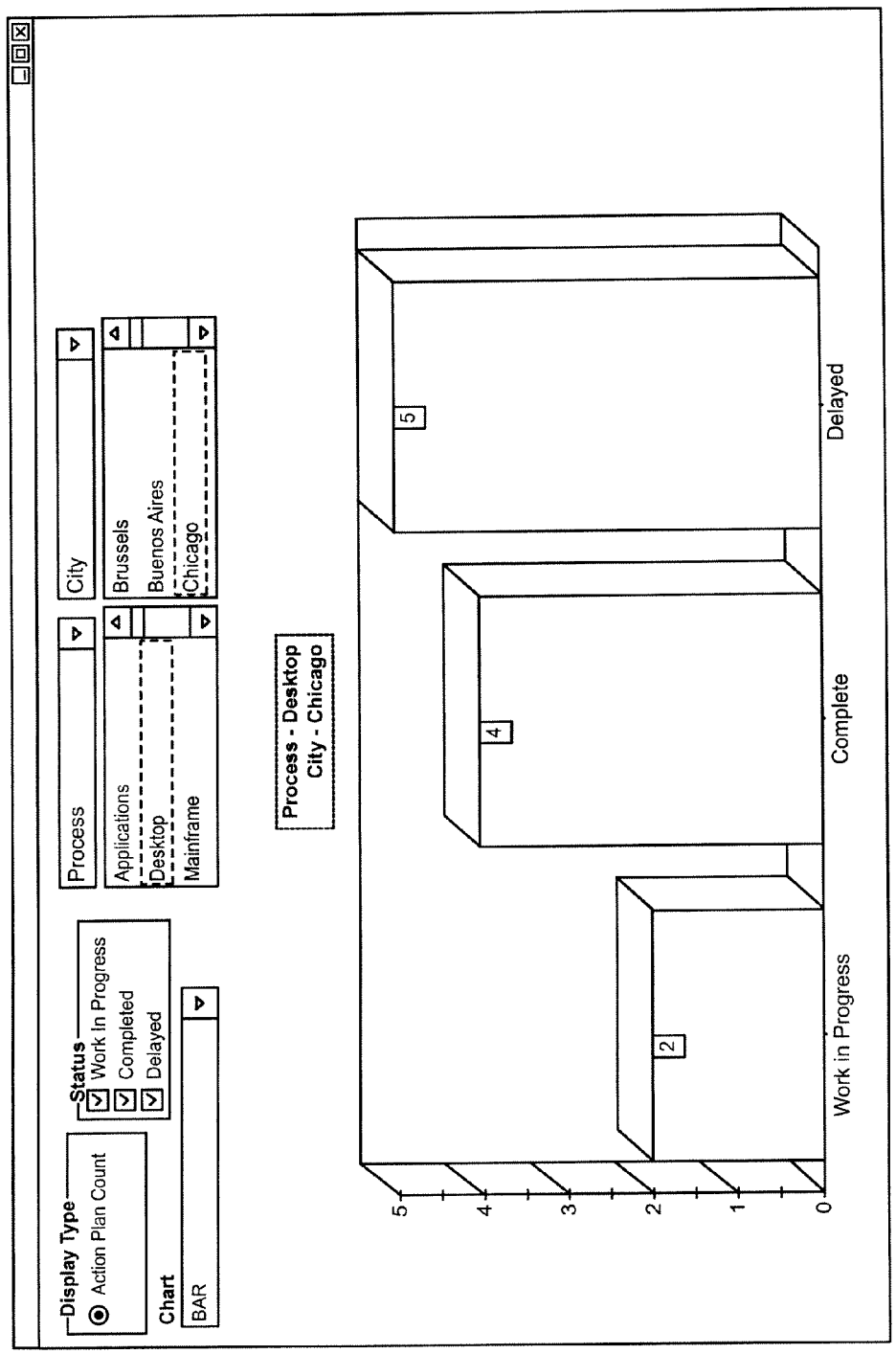
FIG. 10 is an exemplary computer display showing an action plan count sorted by process and city.

FIG. 10 shows an action plan status report for an individual process and individual city. Other reports made possible by the system of the present invention will be understood by those of skill in the art, and include, for example, views showing the number of compliant and non-compliant control procedures sorted by accessing organization.

Although the specification and illustrations of the invention contain many particulars, these should not be construed as limiting the scope of the invention but as merely providing an illustration of the preferred embodiments of the invention. For example, while the system is described in terms of risks and subrisks, it will be understood by those of ordinary skill in the art based on the specification herein that the method and system may be utilized using a single category of risks. Moreover, while the described system is described in terms of identifying one or more control procedures for each subrisk element, it will also be understood by those of ordinary still in the art, based on the specification herein, that the system may be designed to allow assessors to identify non-applicable subrisks in which case it would be unnecessary to identify control procedures for such subrisks. Thus, the claims should be construed as encompassing all features of patentable novelty that reside in the present invention, including all features that would be treated as equivalents by those skilled in the art.

What is claimed is:

1. A method for determining compliance with organizational business policies associated with a business risk, said method comprising:

a. a computer receiving a user selection of a business risk element from a business risk element list which is displayed to the user, said business risk element list being retrieved from a database coupled to said computer;

b. in response to the selection of said business risk element, the computer retrieving one or more predetermined control procedures, the control procedures identified by an administrator as a means for complying with business policies associated with said selected business risk element;

c. the computer associating said one or more predetermined control procedures with said selected business risk element, said predetermined control procedures being stored in said database;

d. in response to the retrieving of the control procedures, the computer retrieving a weight assigned to each one of said predetermined control procedures, said weight being stored in said database;

e. the computer receiving a user selection of a compliance rating for each said predetermined control procedure, the rating selected by the user indicating a level of compliance with each one of said predetermined control procedures, for each of said predetermined control procedures the level of compliance is a subjective rating selected from a rigid set of compliance ratings, the same set of compliance ratings is available for each of said predetermined control procedures, wherein said compliance ratings comprise at least one rating identifying a non-fully compliant control procedure;

f. the computer calculating a compliance score, said compliance score being a function of said assigned weights and said compliance rating of said predetermined control procedures;

g. for each said control procedure having a non-fully compliant rating, the computer receiving a user generated signal indicating whether said non-fully compliant rating is accepted or not accepted; and h. for each said non-fully compliant control procedure which is indicated as not accepted, requiring the user to provide signals for generating an action plan.

2. The method of claim 1 wherein said action plan include a target date, said method further comprising the step of the computer calculating an expected compliance score for one or more future dates based on said action plan target dates.

3. The method of claim 2 further comprising the step of the computer tracking whether said expected compliance scores have been met, said tracking including calculating actual compliance scores for said target dates.

4. The method of claim 3 further comprising the step of the computer displaying said expected compliance scores versus said actual compliance for said target dates.

5. A method for determining compliance with organizational business policies associated with a business risk, said method comprising:

a. a computer receiving a user selection of a business risk element from a business risk element list which is displayed to a user on a display terminal of the computer, said business risk element list being retrieved from a database coupled to said computer;

b. in response to the selection of said business risk element, the computer identifying one or more subrisk elements associated with said business risk element, each said subrisk element being retrieved from said database;

c. for at least one subrisk element, the computer retrieving one or more predetermined control procedures, the control procedures identified by an administrator as a means for complying with business policies associated with said identified subrisk element;

d. the computer associating said one or more control procedures with said subrisk element, said control procedures being stored in said database;

e. the computer retrieving a weight assigned to each one of said predetermined control procedures, said weight being stored in said database;

f. the computer receiving a user selection of a compliance rating for each said predetermined control procedure, each said compliance rating is a subjective rating selected from a rigid predetermined set of compliance ratings, the same set of compliance ratings is available for each of said predetermined control procedures including at least one rating indicating said control procedure is not fully compliant;

g. the computer calculating a compliance score, said compliance score being a function of said assigned weights and said compliance rating of said control procedures;

h. for each said subrisk, the computer determining whether at least one control procedure associated with said subrisk is not fully compliant;

i. for each said subrisk associated with at least one control procedure which is not fully compliant, the computer receiving a signal from the user indicating whether said subrisk should be accepted or not accepted; and j. for each said subrisk which is indicated as not accepted, the computer generating an action plan.

6. The method of claim 5 wherein said action plan further includes a target date, said method further comprising the step of the computer calculating a future compliance score based on said action plan target dates.

7. The method of claim 5 further comprising the step of the computer associating one or more parameters with each said compliance rating.

8. The method of claim 7 further comprising the step of the computer sorting said compliance ratings and displaying said sorted ratings.

9. A method of forecasting compliance with organizational business policies associated with a business risk with the aid of a computer system, said method comprising:

a. the computer identifying a set of business risk elements, said business risk elements being stored in a database coupled to said computer;

b. for at least one of said business risk elements, the computer retrieving one or more predetermined control procedures, the control procedures identified by an administrator as a means for complying with business policies associated with said business risk element;

c. the computer associating said one or more control procedures with said business risk element;

d. the computer retrieving a weight assigned to each one of said predetermined control procedures, said weight being stored in said database;

e. the computer receiving a user selection of a compliance rating for each said predetermined control procedure, said compliance ratings are subjective ratings chosen from a predetermined rigid set of ratings over a uniform range, the same set of compliance ratings is available for each of said predetermined control procedures, including at least one rating identifying a non-fully compliant control procedure and at least one rating identifying fully compliant control procedures;

f. for each said control procedure having a non-fully compliant rating, the user employing the computer to generate an action plan, said action plan including a target date for at least one action listed therein; and g. the computer calculating an expected compliance score for a future date, said expected compliance score being a function of said assigned weights, said fully compliant control procedures, and said action plan target dates for said non-fully compliant control procedures.

10. The method of claim 9 wherein said action plan comprises a signal indicating whether said non-fully compliant rating is accepted or not accepted, said expected compliance score further being a function of said non-fully compliant ratings which have been accepted.

11. A data processing system for determining compliance with organizational business policies associated with a business risk, said system comprising:

a. a database;

b. a processor coupled to said database, said processor being programmed to perform the steps comprising:

i. the computer receiving a first signal identifying a user selection of a set of business risk elements from a business risk element list which is displayed to a user, said business risk elements being stored in said database;

ii. the computer receiving a second signal identifying a user selection of one or more control procedures associated with each said business risk element, said control procedure comprising a means for complying with business policies associated with said risk elements, said control procedures being stored in said database;

iii. the computer receiving a third signal assigning a weight to each said control procedure, said weight being stored said database;

iv. the computer receiving a fourth signal identifying a user selection of a compliance rating for each said control procedure, for each of said predetermined control procedures the compliance rating is selected from a rigid set of compliance ratings, the same set of compliance ratings is available for each of said predetermined control procedures, wherein said compliance ratings comprise at least one rating identifying a non-fully compliant control procedure;

v. the computer calculating a compliance score, said compliance score being a function of said assigned weights and said compliance rating of said control procedures;

vi. for each said control procedure having a non-fully compliant rating, the computer receiving a signal indicating whether said non-fully compliant rating is accepted or not accepted;

vii. for each said non-fully compliant control procedure which is indicated as not accepted, the computer receiving an action plan said action plan including an expected target date for implementation and an expected compliance rating; and viii. the computer generating one or more future expected compliance scores, said compliance scores being a function of said target dates, said assigned weights and said expected compliance rating of said control procedures.

* * * * *